United States Patent [19]

Lang et al.

[11] Patent Number: 4,991,950
[45] Date of Patent: Feb. 12, 1991

[54] MECHANICALLY ADJUSTABLE REAR-VIEW MIRROR

[75] Inventors: Heinrich Lang, Ergersheim; Wolfgang Seiboth, Bad Windsheim, both of Fed. Rep. of Germany

[73] Assignee: MEKRA Rangau Plastics GmbH & Co. KG, Furth, Fed. Rep. of Germany

[21] Appl. No.: 243,102

[22] Filed: Sep. 7, 1988

[30] Foreign Application Priority Data

Sep. 9, 1987 [DE] Fed. Rep. of Germany ....... 3730219
Apr. 6, 1988 [DE] Fed. Rep. of Germany ....... 3811448

[51] Int. Cl.⁵ ............................ G02B 7/18; B60R 1/06
[52] U.S. Cl. .................................... 350/634; 350/636; 350/637; 248/479; 248/481; 248/487
[58] Field of Search ............... 350/637, 632, 633, 634, 350/636, 606; 248/481, 483, 479, 484, 487

[56] References Cited

U.S. PATENT DOCUMENTS

| | | | |
|---|---|---|---|
| 3,459,470 | 8/1969 | Hahn | 350/637 |
| 3,609,014 | 9/1971 | Kurz . | |
| 4,050,776 | 9/1977 | Hsu . | |
| 4,190,326 | 2/1980 | Brodbeck | 350/636 |
| 4,498,738 | 2/1985 | Kumai | 350/637 |
| 4,506,954 | 3/1985 | Enomoto | 350/634 |

FOREIGN PATENT DOCUMENTS

| | | |
|---|---|---|
| 0064422 | 11/1982 | European Pat. Off. . |
| 0090909 | 10/1983 | European Pat. Off. . |
| 0222064 | 5/1987 | European Pat. Off. . |
| 7503867 | 10/1976 | Fed. Rep. of Germany . |
| 2822681 | 10/1981 | Fed. Rep. of Germany . |
| 7815608 | 4/1982 | Fed. Rep. of Germany . |
| 3211794 | 10/1982 | Fed. Rep. of Germany . |
| 3120627 | 12/1982 | Fed. Rep. of Germany . |
| 8236420 | 4/1983 | Fed. Rep. of Germany . |
| 8531670 | 2/1986 | Fed. Rep. of Germany . |
| 2426590 | 12/1979 | France . |
| 0154932 | 8/1985 | Japan ................................. 350/637 |
| 62-152942 | 12/1987 | Japan ................................. 350/637 |

Primary Examiner—Bruce Y. Arnold
Assistant Examiner—R. D. Shafer
Attorney, Agent, or Firm—Browdy and Neimark

[57] ABSTRACT

A mechanically adjustable rear-view mirror has a mounting unit (7) to attach it to a truck. A servomotor unit (20) is mounted between a base plate (18) attached to the mounting unit and a support plate (19) running roughly parallel to the base plate. The base plate is firmly attached to a housing (1) containing the mirror (3). The servomotor unit (20) contains two servomotors (31, 32) which are attached to the support plate (19) and connected to the base plate (18) via actuators (37, 38) and universal joints (41, 42). In addition, a bearing support (43) which is also connected to the base plate (18) by a universal joint (44) is attached to the support plate (19). A pair of universal joints (41, 44 or 42, 44) form a pivot axis for the opposite servomotor (31, 32). This construction is simple, is easy to install and is very stable.

18 Claims, 7 Drawing Sheets

MECHANICALLY ADJUSTABLE REAR-VIEW MIRROR

FIELD OF THE INVENTION

The invention relates to a mechanically adjustable rearview mirror for motor vehicles, particularly trucks, with a housing holding a mirror glass, with a mounting unit which can be securely fixed to the vehicle, with a base plate which is fixed relative to the mounting unit and with a servomotor unit situated between the base plate and the housing and containing two servomotors with actuators by which the housing can be pivoted around two pivot axes which lie practically perpendicular to one another.

BACKGROUND OF THE INVENTION

With rear-view mirrors as described in German Patent Application No. 28 22 681 (in accordance with French Patent Application No. 24 26 590 and Swedish Patent Application 79 04 338), servomotors are mounted on a base plate connected directly to the mirror mounting unit. The actuator of the one servomotor is directly attached to the housing and pivots the housing around the horizontal axis of a universal joint fixed between the housing and the base plate. The other servomotor is attached to the universal joint and thus pivots the housing around its vertical axis. This type of mirror is of a clumsy construction so that its installation is very complicated. Further, the installation depth of the servomotor unit is relatively large so that the housing becomes in turn so large that the field of vision laterally forward of the driver is greatly reduced. This has a detrimental effect when the driver is backing the vehicle, a maneuver which requires accurate spatial location.

European Patent Application 0 090 909 proposes to overcome the above problem of mechanically adjustable rear-view mirrors by directly connecting the servomotor unit to the mounting unit. This configuration does not, however, lead to a sufficiently stable connection between the housing and the mounting unit, especially where larger rear-view mirrors are concerned.

SUMMARY OF THE INVENTION

It is therefore an object of the invention to provide a mechanically adjustable rear-view mirror in such a manner that it is particularly stable, of particularly simple design, particularly easy to install and particularly flat in shape. A support plate (19, 19') immediately next to the mirror glass (3) in the housing (1) is securely mounted relative to the housing (1), the servomotors (31, 32; 31' 32') are mounted to said support plate (19, 19') between said support plate and the base plate (18, 18'), the actuators of the servomotors (31, 32; 31' 32') are each connected to the base plate (18, 18') by a universal joint (41, 42), a bearing support (43, 55) is mounted on the support plate (19, 19') and is connected to the base plate (18, 18') by means of a universal joint (44, 58), and the universal joint (44, 58) of the bearing support (43, 55) and one universal joint (41, 42) of each servomotor (31, 32; 31' 32') form the pivot axes (46, 45) of the other servomotor (31, 32; 31' 32'). In the design in accordance with the invention, the servomotors are securely attached to the housing and mounted in direct proximity to the mirror glass, so that they can be placed relatively far apart without affecting the depth of the housing, in particular the size of the outer surface facing the driver's side of the motor vehicle. Because the servomotors are mounted between the base plate and the support plate, the entire unit is flat and can be easily inserted into or removed from the housing. The three universal joints lie in a single plane directly adjacent to the base plate, and any two universal joints together form the pivoting axis for the other servomotor.

The servomotors are connected to the adjusting links by friction clutches. The universal joint connecting the support plate to the base plate is elastically pretensioned.

By the use of the universal joint of this invention, a bedding with virtually no movement can be achieved. The mirror may be adjusted by hand even when the servomotors are not working, because only the friction coefficient of the clutches must be overcome. The mirror may be made without servomotors so that it can be adjusted manually. The basic design of the mirror remains unchanged so that it can be produced in either a simple form or in a more complicated, mechanically adjustable form.

BRIEF DESCRIPTION OF THE DRAWINGS

Two embodiments of the invention are described with reference to the drawings.

DESCRIPTION OF THE PREFERRED EMBODIMENTS

Figure 1:
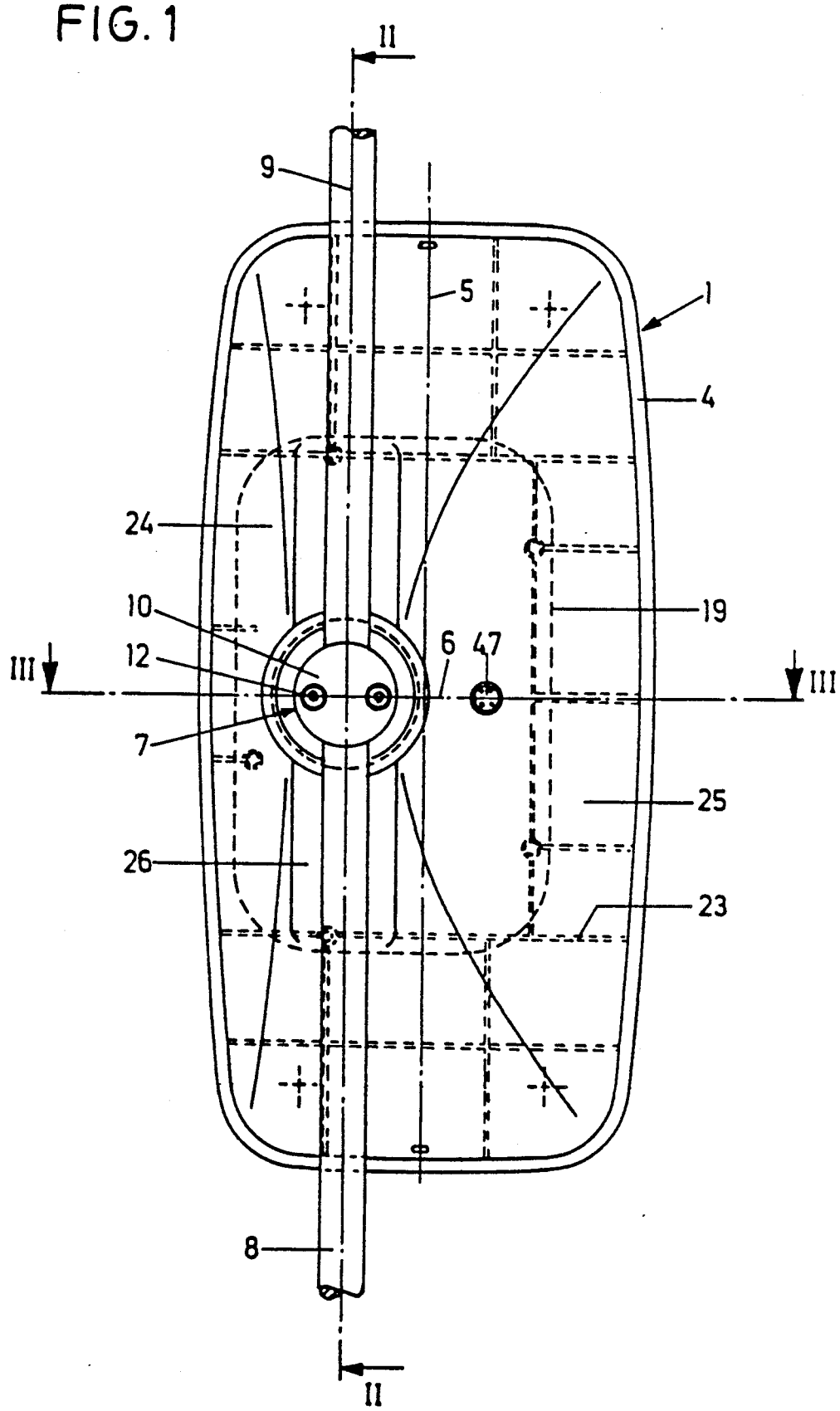
FIG. 1 shows a top view of a rear-view mirror.
Figure 2:
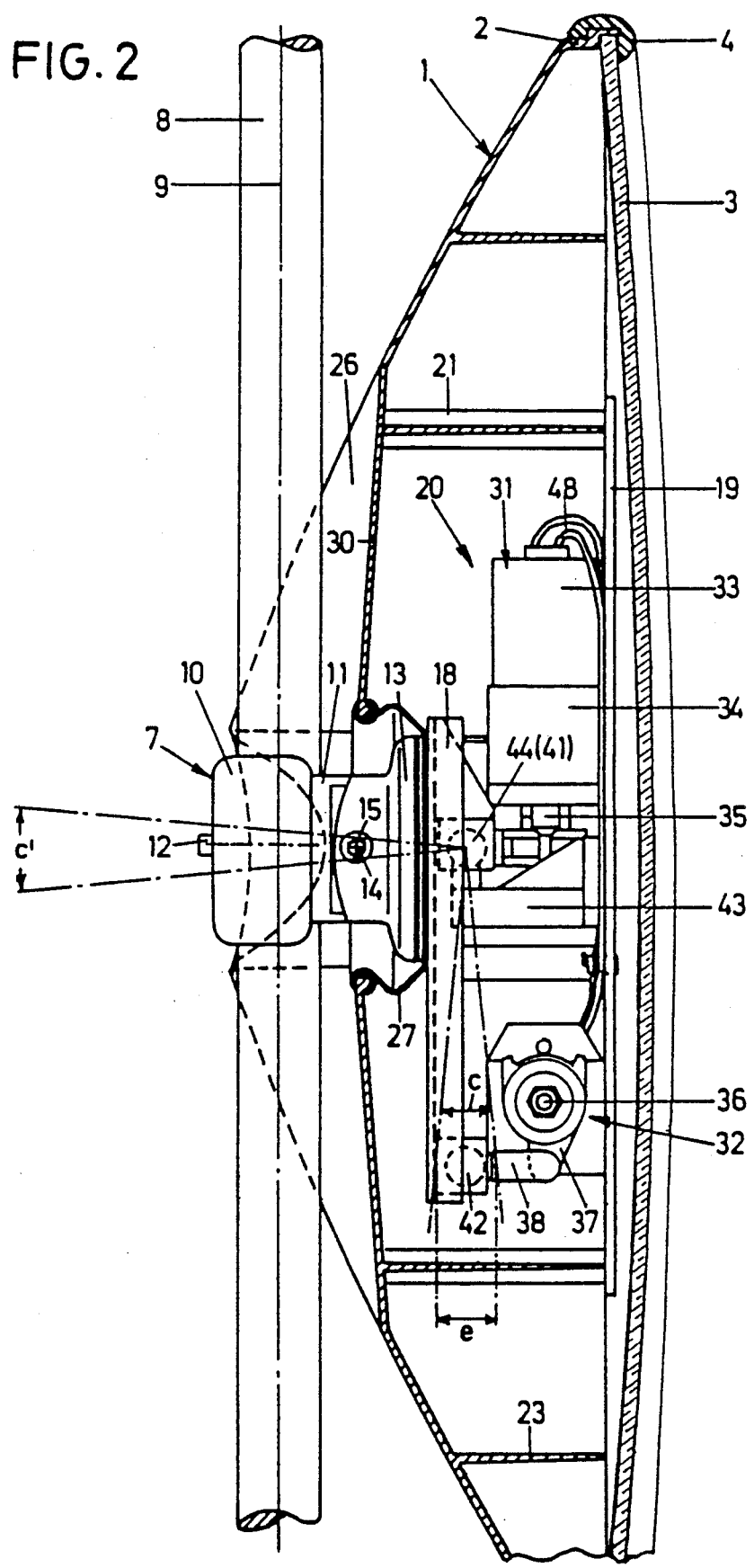
FIG. 2 shows a cross-section through the rear-view mirror along the line II—II in FIG. 1. A servomotor unit mounted in the rear-view mirror is not shown in cross-section.
Figure 3:
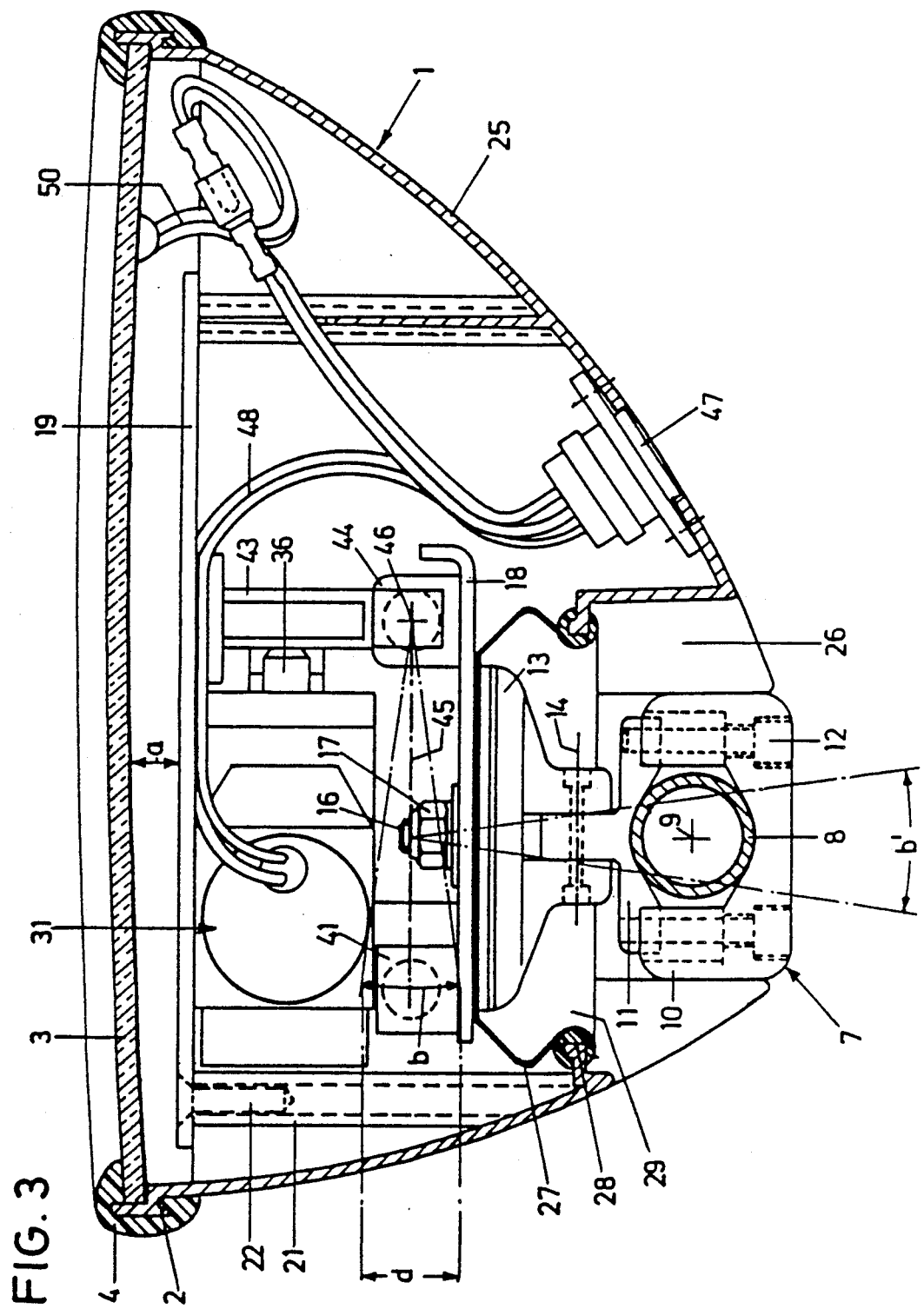
FIG. 3 shows a cross-section through the rear-view mirror along the line III—III in FIG. 1. The servomotor unit is again not shown in cross-section.

The rear-view mirror for trucks shown in FIGS. 1-3 has a housing 1 which contains a glass mounting 2 into which a curved mirror 3 can be interchangeably mounted using a retaining ring 4. The frame-like glass mounting 2 determines the size ef the cross-sectional surface—open to the outside when the mirror 3 has been removed—of the housing 1. In accordance with the cross-sectional surface of the mirror 3, the glass mounting 2 is roughly rectangular in shape. The area bordered by the mounting contains two axes of symmetry 5, 6 running perpendicular to one another, the axis of symmetry 5 being noticeably longer than axis of symmetry 6. In practice, the axis of symmetry 5 is approximately twice as long as the axis of symmetry 6.

The rear-view mirror has a mounting unit 7 similar to a camera tripod clamp which can be clamped to a rod 8 of a fastening bow. Such an L- or C-shaped fastening bow is then attached in the normal manner to the side of the driver's cabin on a truck. With this attachment, the rod 8 is aligned more or less vertically.

The rod's axis 9 is aligned more or less parallel with the axis of symmetry 5. The mounting unit 7 has two clamps 10, 11 on the rod 8 which are held together by screws 12 and fix the rod between them. When the screws 12 are loosened, the rear-view mirror can slide along rod 8 in the direction of the axis 9, as well as be pivoted around the rod 8. The one clamp 11 is attached to a holder 13 on the mounting unit so that it can pivot around an axis 14 which is more or less parallel to the axis of symmetry 6. The clamp 11 is attached to the holder 13 with a locking screw 15 whose longitudinal axis is the same as the pivot axis 14, allowing the rear-view mirror to pivot around the axis 14 when the locking screw 15 is loosened. By using the screw 12 and the locking screw 15 in the above described manner, the basic adjustment of the rear-view mirror—i.e., adjusting the housing 1 with the mirror 3 relative to the rod 8 and therefore relative to the cabin of the truck—can be carried out.

A threaded stem 16 and a nut 17 are used to attach the base 13 to a base plate 18 which is aligned more or less parallel to the two axes 9, 14. A support plate 19 is in turn made parallel to this base plate 18. The support plate 19 is roughly parallel to the glass mounting 2 and thus also to the mirror 3, and sits very close to the glass mounting 2. The distance "a" between the support plate 19 and the glass mounting 2 is approximately 5 to 10 mm. The support plate 19 is fastened to support tubes 21—which are formed in one piece with the housing 1—by means of screws 22. At their sheared edges, these support tubes 21 form stiffening ribs 23 which strengthen the housing 1.

Because, as can be particularly seen in FIG. 1 and FIG. 3, the rod 8 lies off-center to the vertical axis of symmetry 5, the housing 1 presents a highly curved exterior side panel 24 and a correspondingly flat curved exterior side panel 25 relative to the mirror 3 or the glass mounting 2. The two exterior side panels 24, 25 contain a horizontal channel 26 open to the outside in which the rod 8 partially sits and which at least partially holds the clamps 10, 11 of the mounting unit 7. The locking screw 15 can also be accessed through this horizontal channel 26. When mounted on a truck, the flat curved exterior panel 25 faces toward the truck cabin.

A sealing sleeve 27 is clamped between the base 30 and the base plate 18. This sleeve 27 is fixed at the edge 28 of an opening 29 in the housing 1 and covers the base 30 of the longitudinal channel 26 and surrounds the entire mounting unit 7. In practice, the mounting unit 7 with the base plate 18 are attached to the rod 8 and thus, firmly though movably, fixed to the cabin of the truck. The housing 1 with the mirror 3 are, on the other hand, firmly attached to the support plate 19. The entire unit can be adjusted relative to the base plate 18 by means of the servomotors described below.

Two electric servomotors 31, 32 are mounted on the support plate 19. These drives 31, 32 each consist of an electric motor 33 and a reduction gear unit 34 mounted after it. The drive shafts 35, 36 of the two servomotors 31, 32 are mounted vertically to one another with one drive shaft 35 or 36 lying parallel to one of the axis of symmetry 5, 6. An eccentric drive 37 is attached to the drive shafts 35, 36 of each servomotor 31, 32, and a control lever 38 on the eccentric drive 37 is able to pivot around a pivot axis 39 parallel to each drive shaft 35, 36. The end of each control lever 38 opposite the pivot axis 39 is attached to the base plate 18. Adjustments are made by either universal joint 41 or 42, which can be, for instance, a ball joint. One eccentric drive 37 and one control lever 38 combine to form one adjustment unit.

Also attached to the support plate 19 is a bearing support 43 which is also connected to the base plate 18 by a universal joint 44. The universal joint 41 of the servomotor 31 together with the universal joint 44 of the bearing support 43 combine to form a pivot axis 45. The universal joint 42 of the servomotor 32 together with the universal joint 44 of the bearing support 43 combine to form another pivot axis 46. The two pivot axes 45, 46 lie vertically to one another and are respectively parallel to the axes of symmetry 5 and 6. When the servomotor 31 is activated, the support plate 19 along with the housing 1 and the mirror 3 pivot around the pivot axis 46 by an angle "b" of no more than 15° relative to the fixed base plate 18 of the rear-view mirror. This leads to a movement of the housing 1 relative to the axis 9 of the rod 8 by an angle b' of no more than 15°. Angles b and b' are identical.

When the servomotor 32 is activated, the support plate 19 pivots around the pivot axis 45 relative to the fixed base plate 18 by an angle c, which is somewhat smaller than angle b. This angle c can be no more than 10 to 12. This pivoting moves the mirror housing by an angle c', which is again identical to angle c. The maximum area of movement d of the control lever 38 of the adjusting drive 31 can be seen in FIG. 3. Similarly, the maximum area of movement e of the control lever 38 of the adjusting drive 31 can be seen in FIG. 2.

There is a socket 47 in the flat curved exterior side 25 through which circuit paths, e.g. wires, 48, 49 lead to the electric motors 33 of the two servomotors 31, 32. A further wire 50 leads to a heater for the mirror 3, which is not detailed here. The switches for the servomotors 31, 32 are in the truck cabin and are therefore not shown.

The two servomotors 31, 32 are mounted very near the highly curved exterior panel 24. The base plate 18, the support plate 19, the servomotors 31, 32, the bearing support 43 and the mounting unit 7 with the sealing sleeve 27 attached to the base plate 18 all form a single unit which is placed into housing 1 and is held in place merely by tightening the screws 22 and pulling the sealing sleeve 27 over the rim 28.

Figure 4:
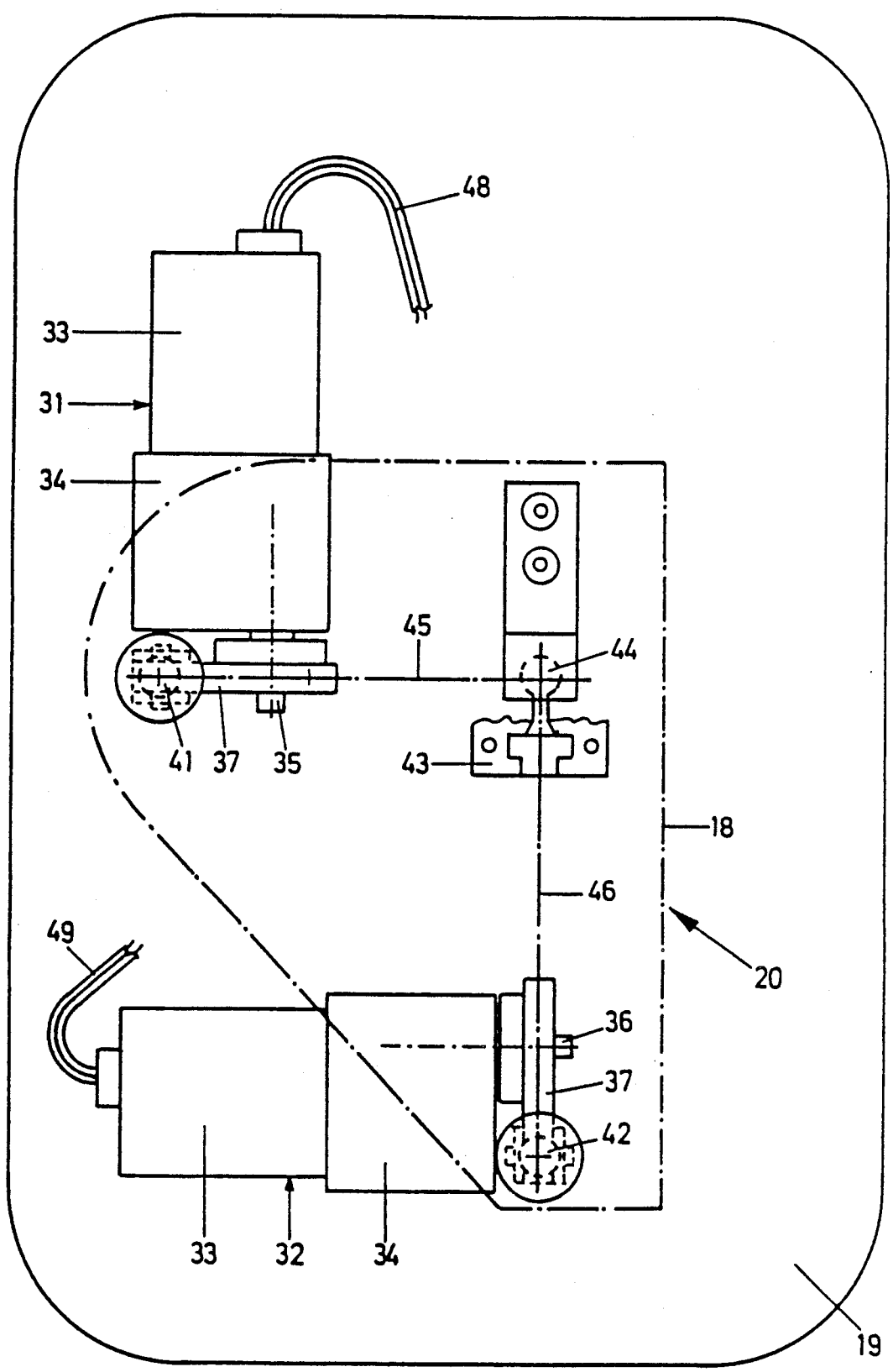
FIG. 4 shows a top view of the servomotor unit and its base plate.

As can be seen particularly in FIG. 4, the described placement 20 of the servomotors provides large spaces between the individual support points formed by the universal joints 41, 42, 44. This makes the entire construction very stable.

Figure 5:
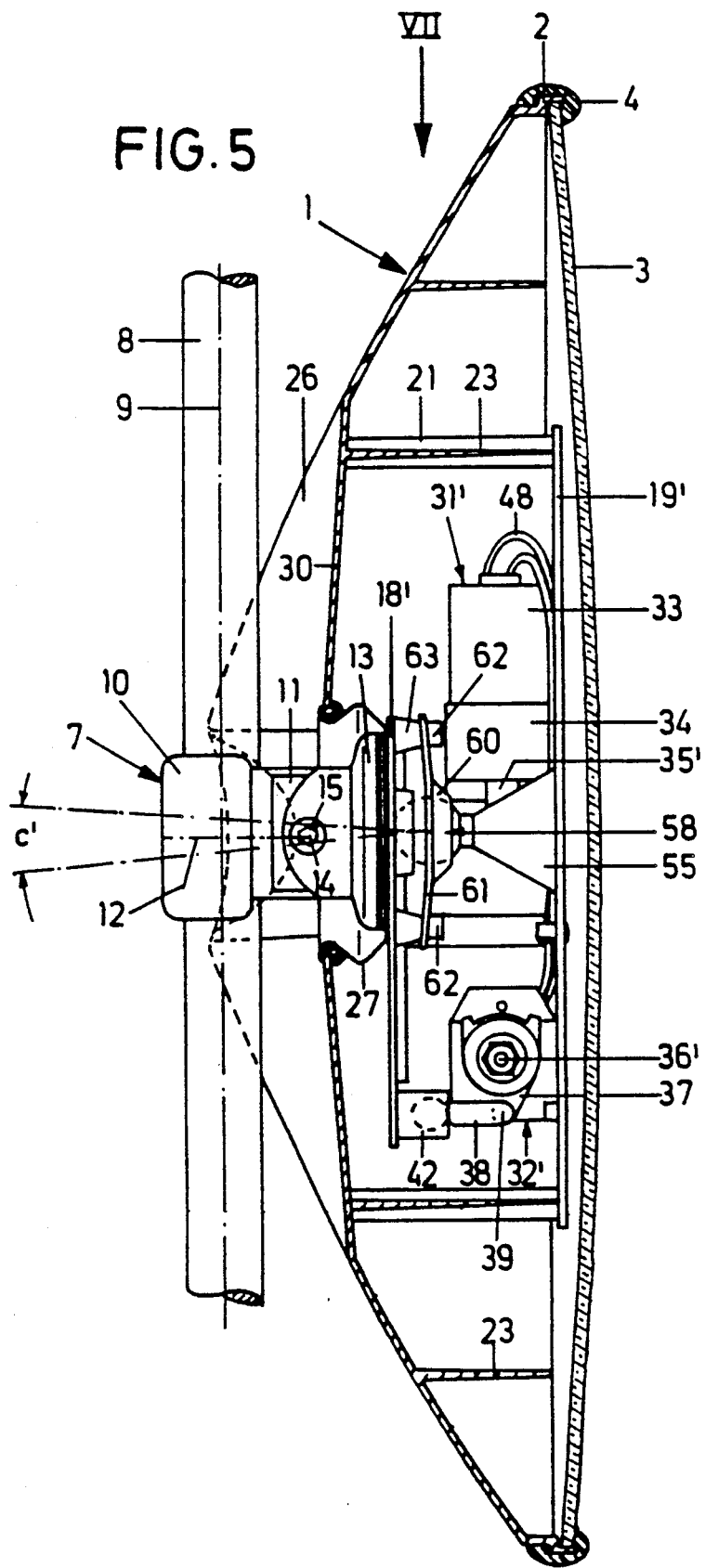
FIG. 5 shows a longitudinal view with the housing removed of another design of the rear-view mirror in accordance with arrow V in FIG. 7.
Figure 6:
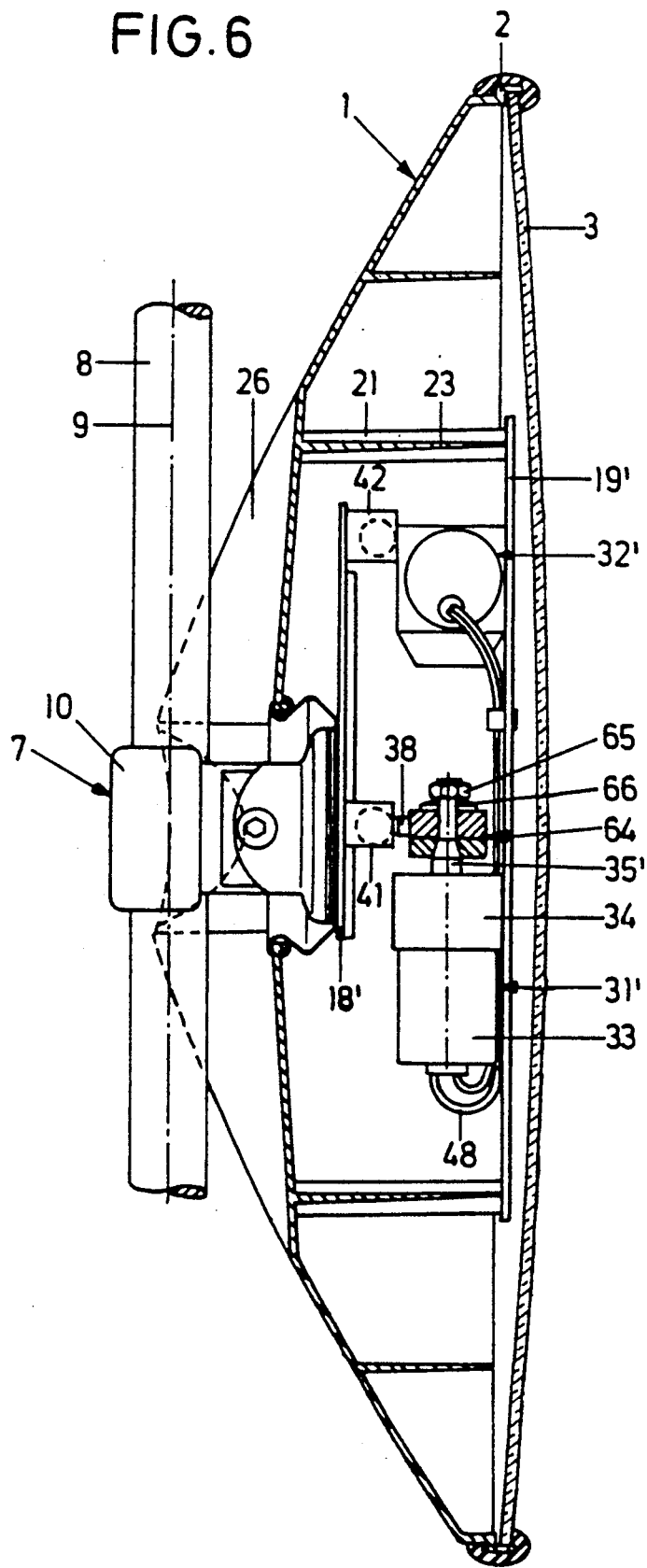
FIG. 6 shows a longitudinal view with the housing removed of the rear-view mirror in accordance with arrow VI in FIG. 7.
Figure 7:
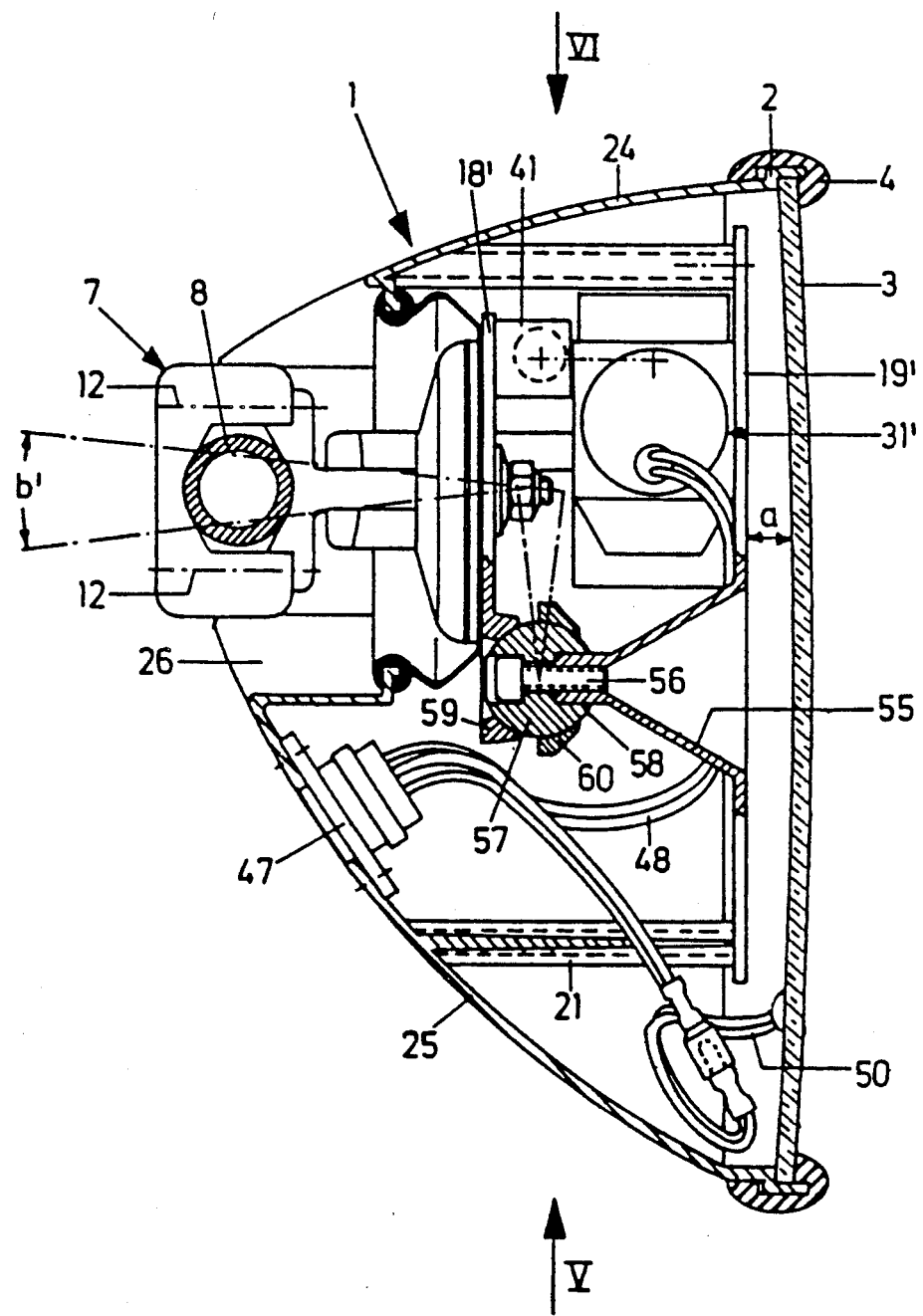
FIG. 7 shows a side view with the housing removed of the rear-view mirror in accordance with arrow VII in FIG. 5.

The constructions in FIG. 5 to 7 do not differ in principle from those in FIG. 1 to 4, they differ only in some—often very advantageous—particulars. For this reason, those parts which are identical to those in FIG. 1 to 4 receive identical numerical identification, and those parts which are constructed slightly differently than those in FIG. 1 to 4 receive an additional apostrophe after their identification numeral. With respect to these parts, no new description will be given, reference merely being made to previous descriptions.

A bearing support 55 is attached to the support plate 19'. As can be seen in FIG. 5 and 7, the bearing support 55 is shaped roughly like a truncated cone and can be formed—for instance by extrusion—of a unitary piece with the support plate 19'. At the upper end of the bearing support 55, the round bearing body 57 of a universal joint 58 is attached by a screw 56. The base plate 18' equipped with a backing shell 59 in the form of a universal ball joint to take up the rounded bearing body 57 and thus support itself from above on the bearing body 57, as can be seen in FIG. 7. Against the side of the bearing body 57 facing toward the bearing support 55 there is a bearing cap 60 also formed in the shape of a universal ball joint. This bearing cap 60 is equipped with elastic fastening frame 61 which is attached to the base plate 18' by means of screws 62 a small distance from the bearing body 57. For this purpose, the base plate 18' contains threaded cones 63. By the elastic deformation of the fastening frame 61 when the bearing cap 60 is screwed onto the base plate 18', the backing shell 59 and the bearing cap 61 are pressed against the bearing body 57, i.e. friction exists between the bearing formed by the backing shell 59 and the bearing cap 60 and the bearing body 57.

As can be seen in FIG. 6, there is a friction clutch 64 between the eccentric drive 37 and the drive axes 35' and 36'. The strength and therefore the torque of this friction clutch 64 can be adjusted by means of a threaded nut 65 and spring washers 66.

In constructions shown in FIG. 5 to 7 the position of the mirror can also be changed by applying sufficient torque to overcome the friction strength produced by the tension set on the universal joint 58 and the friction clutches 64.

The mirror designs shown in FIG. 5 to 7 can also be used without servomotors 31', 32' because sufficient strength is provided by tension of the universal joint 58 described above. On the other hand, the relatively high tension of the universal joint 58 presents no problems when the servomotors 31', 32' are used to adjust the mirror, because the high reduction of the stepdown unit 34 of the servomotors 31', 32' provides sufficient torque between the base plate 18' and the support plate 19'. As can be seen in FIG. 5 and 7, the universal joint 58 is positioned approximately in the center of the mirror 3 so that movement of the mirror is around a more or less central axis. Because of the above mentioned tension between the backing shell 59 and the bearing cap 60 relative to one another, the universal joint 58 exhibits practically no play.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

We claim:

1. A mechanically adjustable rear-view mirror for motor vehicles, comprising a housing (1) holding a mirror glass (3), a mounting unit (7) for securely fixing to the vehicle, a base plate (18, 18') which is fixed relative to the mounting unit (7) and with a servomotor unit (20, 20') mounted between the base plate (18, 18') and the housing (1), said servomotor unit comprising two servomotors (31, 32; 31', 32') with actuators by which the housing (1) is pivoted around two pivot axes (45, 46) which lie practically perpendicular to one another, wherein a support plate (19, 19') immediately next to the mirror glass (3) in the housing (1) is securely mounted relative to the housing (1), the servomotors (31, 32; 31', 32') are mounted to said support plate (19, 19') between said support plate and the base plate (18, 18'), the actuators of the servomotors (31, 32; 31', 32') are each connected to the base plate (18, 18') by a universal joint (41, 42), a bearing support (43, 55) is mounted on the support plate (19, 19') and is connected to the base plate (18; 18') by means of a universal joint (44; 58), and the universal joint (44; 58) of the bearing support (43; 55) and one universal joint (41, 42) of each servomotor (31, 32; 31', 32') form the pivot axes (46, 45) of the other servomotor (31, 32; 31', 32').

2. A rear-view mirror in accordance with claim 1, wherein the universal joints (41, 42, 44; 58) are formed as universal ball joints.

3. A rear-view mirror in accordance with claim 1, wherein the housing (1) has exterior side panels (24, 25) one of which is steep relative to the mirror (3), and the other one is flatter; whereby a pivot axis (46) runs roughly parallel to the exterior side panels (24, 25), the servomotor (31; 31') needed to pivot around the other pivot axis (45) being mounted between the pivot axis (46) and the steeper exterior side panel (24).

4. A rear-view mirror in accordance with claim 1, wherein the base plate (18; 18'), the support plate (19; 19'), the servomotors (31, 32; 31', 32') and the bearing support (43; 55) form a removable unit with the housing (1).

5. A rear-view mirror in accordance with claim 4, wherein there is a sealing sleeve (27) is located between the base plate (18; 18') and the mounting unit (7) which is fixed to an opening (29) in the housing (1).

6. A rear-view mirror in accordance with claim 1, Wherein the servomotors (31, 32; 31', 32') comprise an electric motor (33) followed by a reduction unit (34) having adjustment linkages formed by one eccentric drive (37) on which is attached the actuator (38).

7. A rear-view mirror in accordance with claim 1, wherein the universal joint (58) connecting the support plate (19') to the base plate (18') via the bearing support (55) is elastically pre-tensioned.

8. A rear-view mirror in accordance with claim 7, wherein the universal joint (58) has an at least partially spherical bearing body (57) attached to the bearing support (55) against which a backing shell (59) of the base plate (18') on the one side and a bearing cap (60) are held together by elastic tension.

9. A rear-view mirror in accordance with claim 1, wherein the servomotors (31', 32') are connected to the adjusting links by friction clutches.

10. A rear-view mirror in accordance with claim 1, wherein said glass (13) is held by a glass mounting (2) contained in a housing.

11. A mechanically adjustable rear-view mirror for motor vehicles, comprising a housing (1) holding a mirror glass (3), a mounting unit (7) for securely fixing said housing to the vehicle, a base plate (18; 18') which is fixed relative to the mounting unit (7) and with a servomotor unit (20; 20') mounted between the base plate (18; 18") and the housing (1), said servomotor unit comprising two servomotors (31, 32; 31', 32') with actuators by which the housing (1) is pivoted around two pivot axis (45, 46) which lie practically perpendicular to one another, wherein a support plate (19, 19') immediately next to the mirror glass (3) in the housing (1) is securely mounted relative to the housing (1), the servomotors (31, 32; 31' 32') are mounted to said support plate (19, 19') between said support plate and the base plate (18, 18'), the actuators of the servomotors (31, 32; 31' 32') are each connected to the base plate (18, 18') by a universal joint (41, 42), a bearing support (43, 55) is mounted on the support plate (19, 19') and is connected to the base plate (18, 18') by means of a universal joint (44, 58), and the universal joint (44, 58) of the bearing support (43, 55) and one universal joint (41, 42) of each servomotor (31, 32; 31' 32') form the pivot axis (46, 45) of the other servomotor (31, 32; 31', 32'); and wherein the universal joint (58) connecting the support plate (19') to the base plate (18') via the bearing support (55) is elastically pre-tensioned.

12. A rear-view mirror in accordance with claim 11, wherein the universal joints (41, 42, 44, 58) are formed as universal ball joints.

13. A rear-view mirror in accordance with claim 11, wherein the housing (1) has exterior side panels (24, 25) one of which is steep relative to the mirror (3), and the other one is flatter; whereby a pivot axis (46) runs roughly parallel to the exterior side panels (24, 25), the servomotor (31, 31') needed to pivot around the other pivot axis (45) being mounted between the pivot axis (46) and the steeper exterior side panel (24).

14. A rear-view mirror in accordance with claim 11, wherein the base plate (18, 18'), the support plate (19, 19'), the servomotors (31, 32; 31' 32') and the bearing support (43, 55) form a removable unit with the housing (1).

15. A rear-view mirror in accordance with claim 11, wherein there is a sealing sleeve (27) located between the base plate (18, 18') and the mounting unit (7) which is fixed to an opening (29) in the housing (1).

16. A rear-view mirror in accordance with claim 11, wherein the servomotors (31, 32; 31' 32') comprise an electric motor (33) followed by a reduction u nit (34) having adjustment linkages formed by one eccentric drive (37) on which is attached the actuator (38).

17. A rear-view mirror in accordance with claim 11, wherein the universal joint (58) has an at least partially spherical bearing body (57) attached to the bearing support (55) against which a backing shell (59) of the base plate (18') on the one side and a bearing cap (60) are held together by elastic tension.

18. A rear-view mirror in accordance with claim 11, wherein the servomotors (31', 32') are connected to the adjusting links by friction clutches.

* * * * *